Patented July 2, 1929.

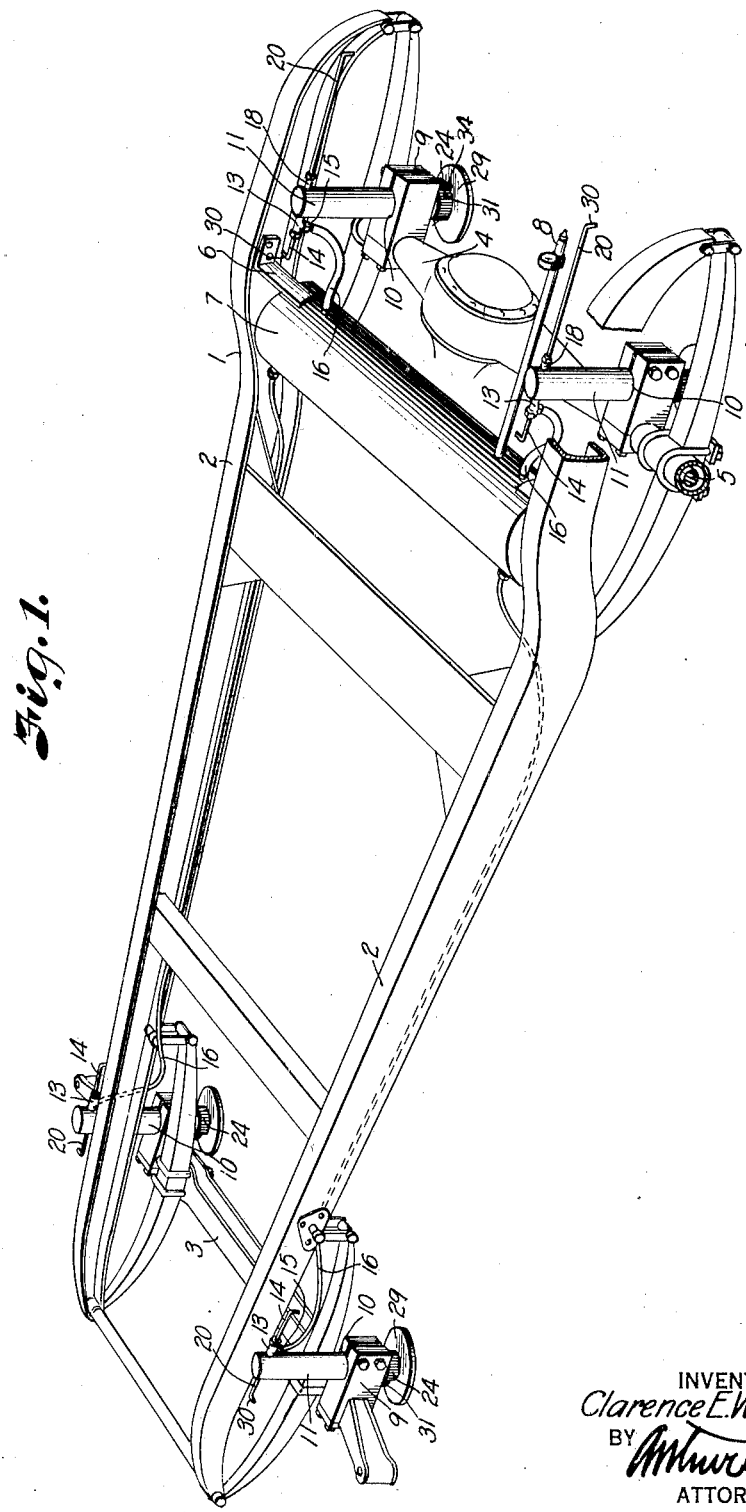

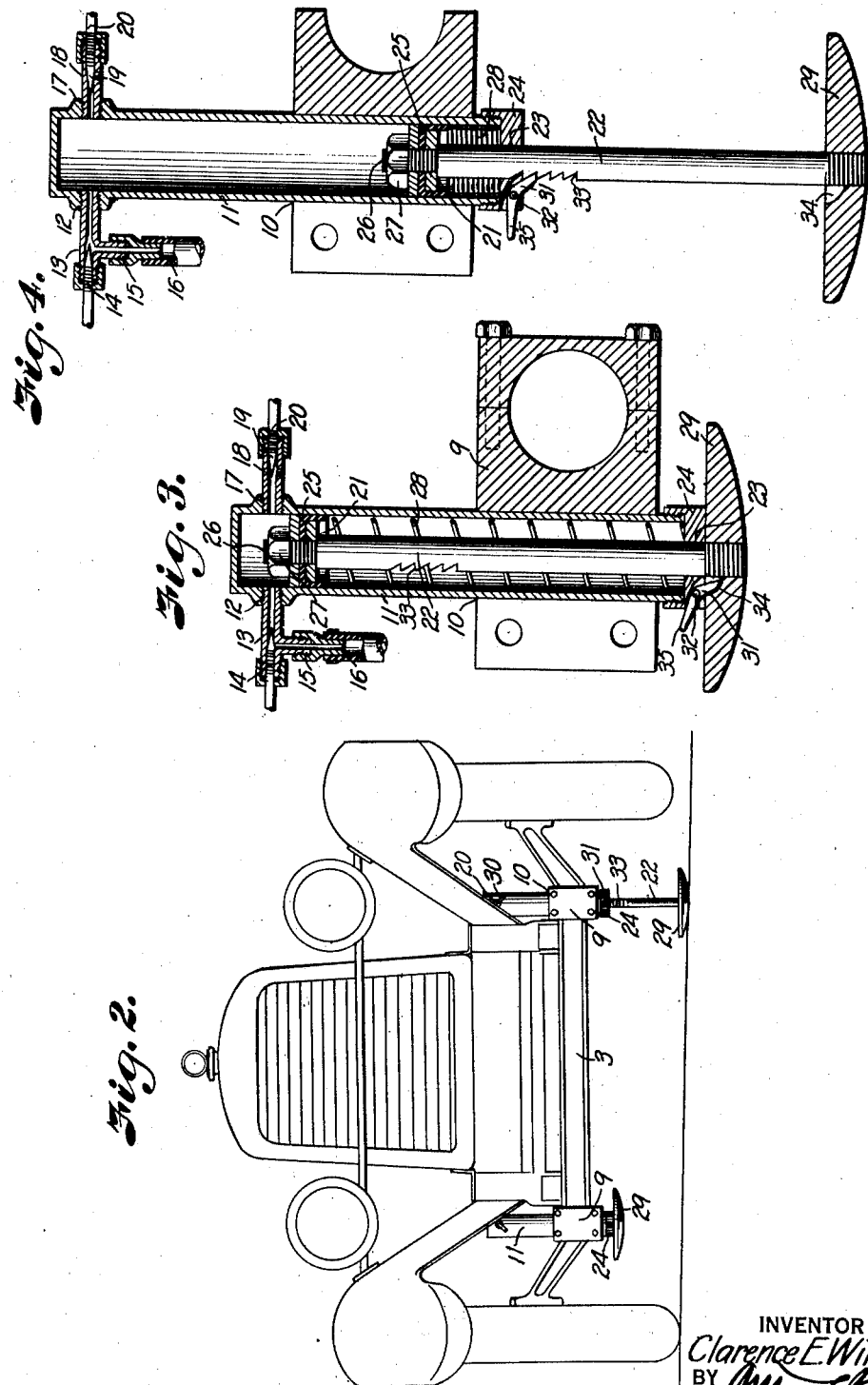

1,719,740

UNITED STATES PATENT OFFICE.

CLARENCE E. WILLIAMS, OF KANSAS CITY, MISSOURI.

PNEUMATIC JACK.

Application filed May 23, 1927. Serial No. 193,440.

My invention relates to jacks and more particularly to automobile jacks.

The object of the invention is to provide pneumatic means for actuating automobile jacks.

The object is accomplished by structure and elements which will be particularly described in their preferred forms, with references to the accompanying drawings wherein:

Fig. 1 is a perspective view of an automobile chassis equipped with my invention.

Fig. 2 is a front elevation of an automobile, showing one jack in retracted position and one jack in actuated position.

Fig. 3 is a vertical view of a jack and associated elements, the foot of the jack shown retracted.

Fig. 4 is a similar sectional view, showing a jack extended for elevating a portion of an automobile.

Referring in detail to the drawings:

1 designates generally the chassis of an automobile having the frame members 2, the front axle 3, and the rear axle housing 4 with its enclosed axle 5. Mounted by brackets 6 secured to the frame members is a reservoir 7 for compressed air, provided with the inlet tube 8 for supplying a charge of compressed air thereto. Brackets 9 are secured to the front axle 3, and preferably to portions exterior to the chassis; and to the rear axle housing 4 but between the frame members of the chassis. The parts mentioned as attached to the chassis may be otherwise positioned and secured, and they may be installed for other sorts of frames.

Jacks 10, four being provided in the illustrated usage so that one will be available adjacent each wheel of the vehicle, are supported by the brackets 9, the jacks and the parts associated therewith being substantially identical so that the description of one will suffice for all.

A jack comprises a cylinder 11 fixed in the brackets, a cylinder being provided with an inlet 12 in which is a nipple 13. A needle valve 14 is installed in the nipple. A branch 15 of the nipple is provided, to which a tube 16 is connected, the tube 16 providing the communication between the source of compressed air and the cylinder. The cylinder also has a vent port 17 provided with a nipple 18 in which is a needle valve 19, the valve having an elongated stem 20 for convenience in actuating the same for venting the cylinder after actuation and service of the device.

Slidable in the cylinder is a piston 21 comprising a stem or shaft 22 projectable through aperture 23 in the end cap 24 of the cylinder, and a piston head 25 through which the reduced upper end 26 of the stem projects and to which the stem is secured by a nut 27.

Mounted in the cylinder between the piston head and the end cap 24 of the cylinder is a coil spring 28 adapted for compression upon propulsion of the piston under the influence of admitted compressed air, and for returning the piston head and stem to retracted position when the pressure in the cylinder is relieved.

A footing member 29 is secured on the lower end of the stem 22. The cylinder is so provided that the footing is spaced from the ground sufficiently to effect ample clearance, the footing member being projectable to the ground, and continuance of projection causing the elevation of the vehicle.

The cylinders are separately actuatable by the actuation of needle valves 14. Valves may be opened and closed for admission of compressed air to the cylinders and for discontinuing the admission, by crank handles 30. The handles may be extended or may be connected with any suitable device for remote control. Similarly the stems 20 of the vent valves may be controlled by elements positioned on other parts of a vehicle.

Means are provided for latching a jack in actuated position to support a portion of a vehicle elevated by the pneumatic operation of the jack, and relieve the compressed air of the duty of prolonged support, comprising a pawl 31 pivotally mounted at 32 on the end cap 24 of the cylinder, and adapted to engage the teeth 33 produced on a selected portion of the shaft 22. A recess 34 is provided in the footing member 29, to receive the pawl upon return of the stem into the cylinder. The pawl may be manually actuated directly, by pressure on its lever arm 35, or the arm may be connected with distant control means.

When it is desired to elevate a portion of an automobile, for example, to raise one wheel from the ground, air is admitted to the cylinder adjacent the wheel to be raised, to project the footing to contact with the ground and cause the elevation of the wheel to the desired height, the delivery of air being then interrupted by the closing of the valve. When it is desired to restore the portion of the automobile to lowered position, the pawl 31 is released, the valve 18 is opened to permit the air in the cylinder to depart, the effective port area being regulated to restrain the retraction of the piston into the cylinder and avoid excessive jarring in the re-seating of the wheel on the ground. When the wheel has become seated on the ground and no pressure is being exerted on the jack footing, the continuance of retraction of the stem into the cylinder and the spacing of the footing from the ground, is provided for by the spring, which propels the piston upwardly in the cylinder. The spring thus removes the jack footing to a position where it will not encounter obstruction in the roadway during movement of the automobile.

Among the variations from the illustrated structure which may be employed without departing from the spirit of my invention, may be mentioned the fixing of a piston element to a frame, and the provision of a footing member on a cylinder, in which structure the cylinder would be slidable in a frame bracket to be projected against the ground to lift the frame.

What I claim and desire to secure by Letters Patent is:

A pneumatic jack for motor vehicles including a bracket attachable to a vehicle axle, a cylinder vertically adjustable in the bracket and having a closed upper end, a cap on the opposite end of the cylinder having a central opening and a radially disposed slot communicating with the opening, a pawl in said slot projectable into said opening, a piston in the cylinder having a rod extended through said opening and having ratchet teeth adjacent its upper end adapted for engagement by said pawl, a foot piece on the end of said rod, a spring in the cylinder normally supporting the piston in retracted position, and valve controlled air inlet and air outlet conduits communicating with the upper end of said cylinder for controlling actuation of said piston.

In testimony whereof I affix my signature.

CLARENCE E. WILLIAMS.